United States Patent
Klapper et al.

(10) Patent No.: US 6,448,982 B1
(45) Date of Patent: Sep. 10, 2002

(54) SYSTEM FOR GRAPHICALLY GENERATING LOGIC FOR A CAUSE AND EFFECTS MATRIX

(75) Inventors: John P. Klapper, Doylestown, PA (US); Daniel Lelievre, Neuilly-Plaisance (FR)

(73) Assignee: Siemens Energy & Automation, Inc., Spring House, PA (US)

( * ) Notice: Subject to any disclaimer, the term of this patent is extended or adjusted under 35 U.S.C. 154(b) by 0 days.

(21) Appl. No.: 09/298,045

(22) Filed: Apr. 22, 1999

Related U.S. Application Data

(60) Provisional application No. 60/082,714, filed on Apr. 23, 1998.

(51) Int. Cl.[7] .................................................. G06F 3/00
(52) U.S. Cl. ....................... 345/764; 345/700; 345/440; 345/966; 706/45; 706/46
(58) Field of Search .................................. 345/440, 764, 345/966, 809, 771, 700; 706/45, 46, 50, 60, 59

(56) References Cited

U.S. PATENT DOCUMENTS 4,730,259 A  *  3/1988  Gallant ....................... 364/513
6,208,324 B1  *  3/2001  Sundstrom et al. ......... 345/115

* cited by examiner

*Primary Examiner*—Kristine Kincaid
*Assistant Examiner*—Mylinh T Tran
(74) *Attorney, Agent, or Firm*—Drinker Biddle & Reath LLP

(57) ABSTRACT

The present invention provides a system and method for graphically generating logic for a cause and effects matrix. The present invention includes creating a matrix for defining the elements of the system that require monitoring, the responses to changes in the monitored elements and the relationship between the elements and the responses and automatically creating logic to implement the matrix. The system includes a general purpose digital computer that incorporates a matrix programming tool to input data defining the matrix and generate a matrix database. The tool also transfers the matrix database to a programmable logic controller. The programmable logic controller includes a matrix functional unit. The matrix functional unit includes several predefined, configurable functional units for establishing the logic pathways to implement the matrix. The predefined, configurable functional units include a cause functional unit, an effects functional unit and an intersection functional unit. Once the predefined functional units receives the matrix database information from the computer the logic pathways to implement the matrix are automatically established.

11 Claims, 14 Drawing Sheets

Cause Logic Detail

Effect Logic Detail

SYSTEM FOR GRAPHICALLY GENERATING LOGIC FOR A CAUSE AND EFFECTS MATRIX

This application claims priority from provosional application No. 60/082,714, filed Apr. 23, 1998.

FIELD OF THE INVENTION

The present invention is directed to a system and method for generating logic for a Cause and Effects Matrix which may be used in a monitoring system. The present invention includes creating a matrix for defining the elements of the system that require monitoring, the responses to changes in the monitored elements and the relationship between the elements and the responses and automatically creating logic to implement the matrix. The present invention is directed to a system and method for graphically generating the Cause and Effects Matrix and implementing the matrix utilizing predefined logic as defined by the programming environment of the monitoring system, for example function blocks, to establish a particular cause, a particular effect and a relationship therebetween.

BACKGROUND OF THE INVENTION

Cause and effects matrices are used in many industries for many purposes. The basic concept of a Cause and Effects Matrix is to provide a means for monitoring the activity of a process system and effecting a change in the system if specified events (causes) occur. For example, a safety engineer is aware of and understands the various events that could occur with respect to a process system and the responses the various events require. This engineer creates a Cause and Effects Matrix for that process system. Typically, the matrix lists possible causes along a first axis and lists possible Effects along a second axis, and sets forth a relationship between a particular cause and a particular Effect enumerated at an intersection for the Cause and the Effect in the matrix.

A "cause" is a theoretical construct that defines the data necessary to monitor each event in the process system. The cause includes information that defines which sensors to monitor and parameters that define the sensor type and how the data received from the sensor(s) is to be interpreted. A record of this information is established for each cause. The records are maintained in a cause database. In other words, for each cause in a Cause and Effects Matrix there is a cause record. A Cause and Effects Matrix that includes twelve causes will have twelve cause records. An "effect" is a theoretical construct similar to the cause, but instead defines the data necessary to respond to the events of the process system. The effect includes information that defines which actuator(s) to operate and how to operate them. A record of this information is established for each effect. The records are maintained in an effects database. In other words, for each effect in a Cause and Effects Matrix, there is an effects record. A Cause and Effects Matrix that includes ten effects will have ten effects records.

A Cause and Effects Matrix can be a valuable analysis tool because all of the interactions between the listed causes and effects are explicitly shown. FIG. 1 illustrates an example of a Cause and Effects Matrix 16.

In the process industry, for example, in offshore oil drilling applications, safety engineers have used cause and effects matrices to describe and document a safety strategy. The Cause and Effects Matrix identifies all possible process events (causes) and the relationship the events have with possible responses to events (effects). Typically, Cause and Effects Matrices, as generated by the safety engineer, are included as part of a specification of a safety implementation system. The Cause and Effects Matrix is then translated by an instrumentation and control engineer into the design of a logic solver. When using programmable logic controllers (PLCs), for example, this typically means the arduous labor intensive job of implementing some type of logic, for example ladder logic or Boolean function block diagrams. Once the logic is implemented, the Cause and Effects Matrix is used to test the logic.

It is not uncommon for various errors to arise during the development of the logic for the Cause and Effects Matrix. In conventional systems and methods, each error that arises when generating the logic for the matrix requires time and labor intensive review of the developed code to locate and correct the errors. As such, conventional systems and methods require extensive testing to verify the logic implementation. Furthermore, modifications of the matrix require complete retesting to confirm proper logic implementation.

SUMMARY OF THE INVENTION

The present invention provides a system and method for generating logic for a cause and effects matrix.

The method of the present invention includes generating a matrix database including data defining an input parameter, an output response, and a relationship between the input parameter and the output response. The defining data of the matrix database is transferred to a matrix functional unit, the matrix functional unit including an input parameter functional unit, an output response functional unit and an intersection functional unit. The input parameter functional unit includes predefined, configurable logic for defining a particular input parameter. The output response functional unit includes predefined, configurable logic for defining a particular output response. The intersection functional unit includes a predefined, configurable logic for defining the relationship between the input parameter and the output response. Transferring the matrix database to the matrix functional unit configures the predefined input parameter logic, configures the predefined output response logic, and configures the predefined intersection logic.

The system of the present invention includes a matrix functional unit including an input parameter functional unit, an output response functional unit, and an intersection functional unit. The input parameter functional unit includes predefined, configurable logic for defining an input parameter. The output response functional unit includes predefined, configurable logic for defining an output response. The intersection functional unit includes predefined, configurable logic for defining the relationship between the input parameter and the output response. The system also includes a matrix database including data defining the input parameter, the output response, and the relationships between the input parameter and the output response and has a matrix programming tool for inputting the data into the database.

The present invention provides a system and method for graphically creating and configuring a matrix and for automatically establishing logic for implementing the matrix upon transferring data defining the matrix to a predefined, configurable functional unit.

BRIEF DESCRIPTION OF THE DRAWINGS

For the purpose of illustrating the invention, there is shown in the drawings a form which is presently preferred.

it being understood, however, that this invention is not limited to the precise arrangements and instrumentalities shown.

DETAILED DESCRIPTION OF THE INVENTION

Figure 2:
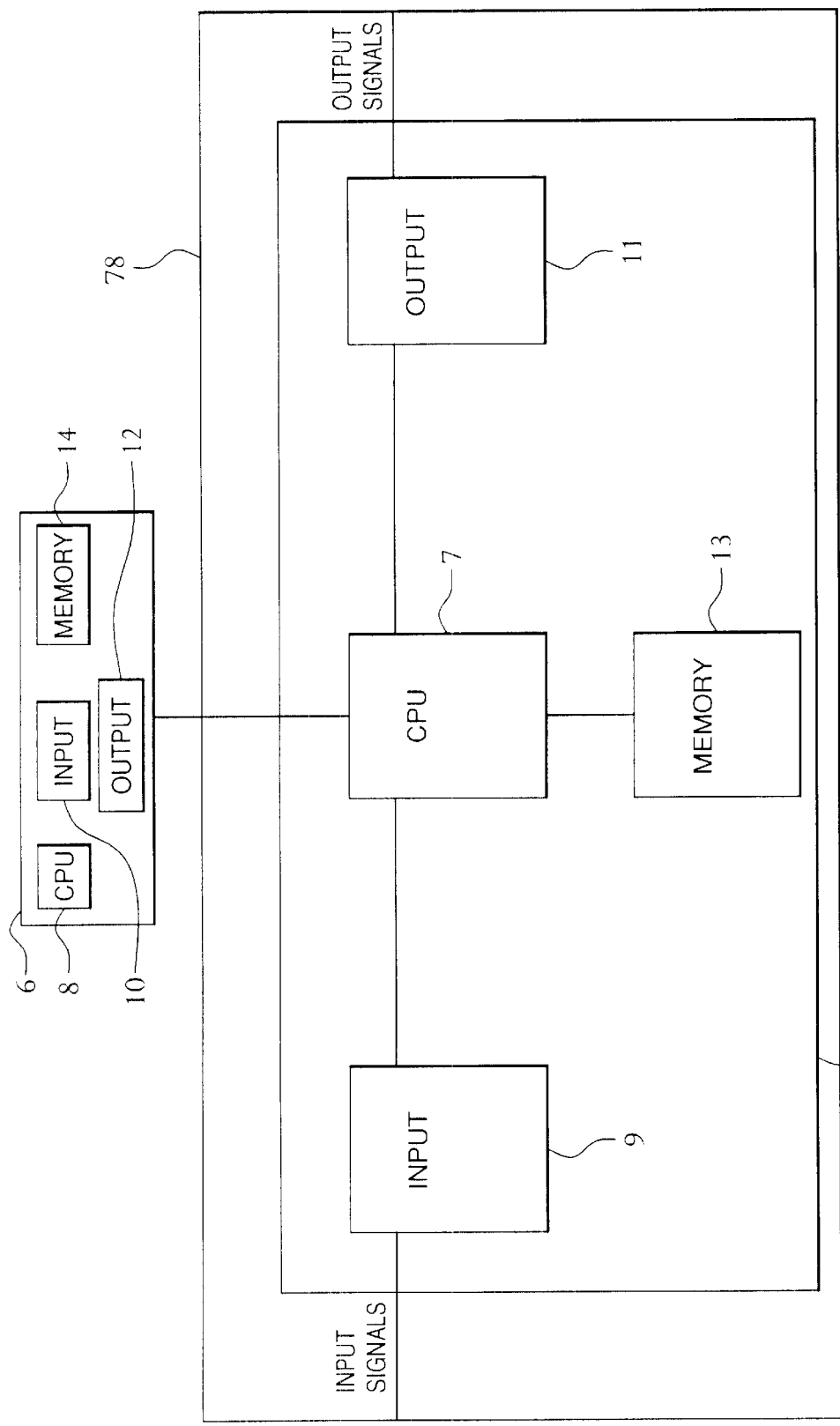
FIG. 2 is a physical block diagram of a system of the present invention.
Figure 3:
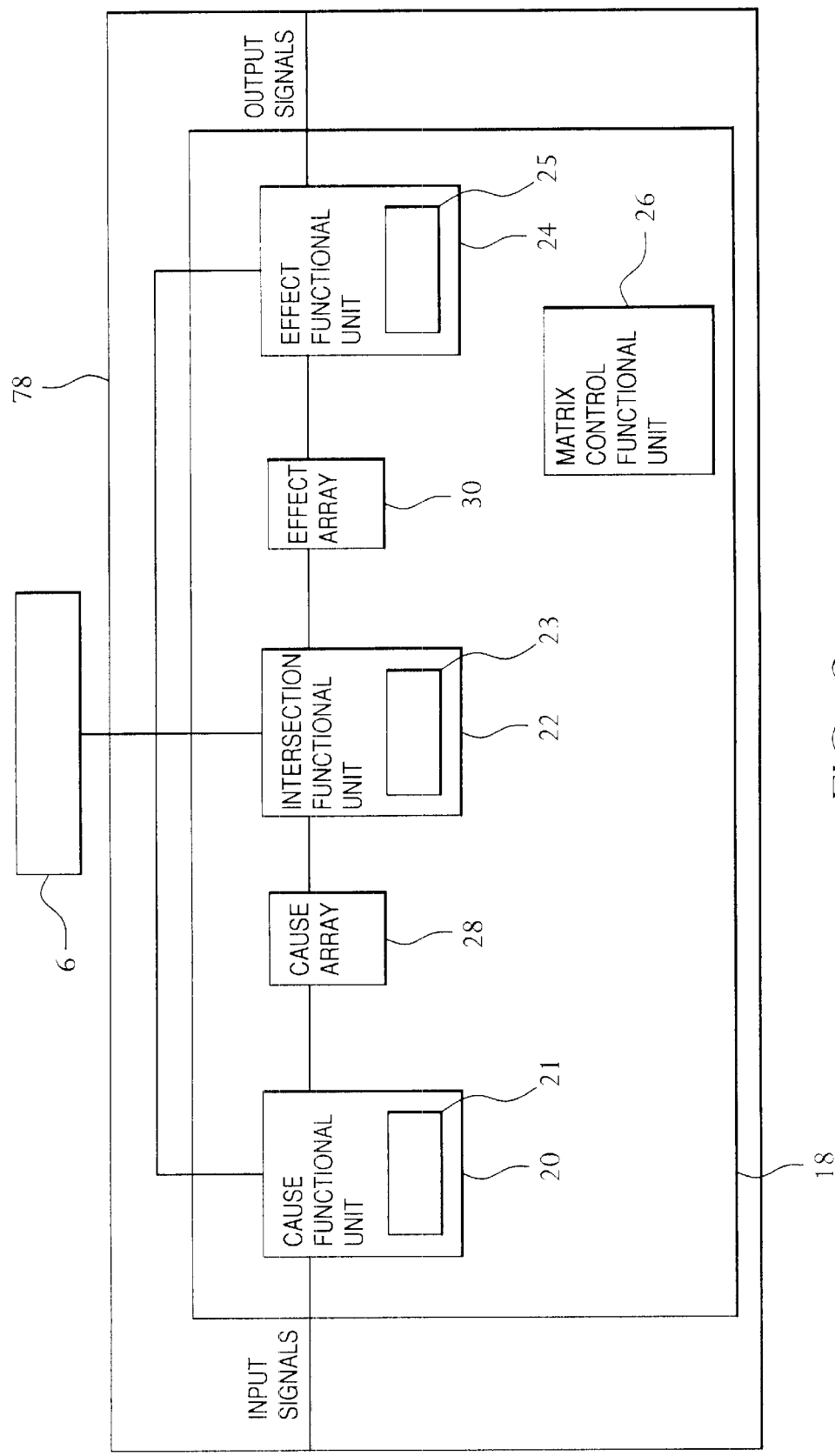
FIG. 3 is a logical block diagram of a programmable logic controller of the present invention.

The present invention enables a user to graphically create and configure a matrix with data that defines input elements or variables that require monitoring, output responses to changes in the input elements/variables, also referred to as input parameters, being monitored and the relationship between the input elements/variables and the output responses. Once the matrix is created, the user can transfer the defining data to a programmable logic controller 78 to generate logic to implement the matrix. The programmable logic controller 78, as illustrated in FIG. 2 may comprise a central processing unit 7, an input device 9, an output device 11, and a memory element 13. The memory element 13 may be a combination of read only memory (ROM) and random access memory (RAM). As illustrated in FIG. 3, the programmable logic controller 78 includes a matrix functional unit 18. The matrix functional unit 18 includes at least one input functional unit for the input elements/variables, at least one output functional unit for the output responses, and at least one intersection functional unit for the relationships between the input elements/variables and the output responses. Simply providing the defining data to the programmable logic controller automatically defines the logic pathways in the logic functional units for implementing the matrix. The present invention provides a matrix programming tool that includes a graphical user interface that enables the user to easily define an element/variable, a response, and the relationship there between; transfer the defining data to the programmable logic controller; and recall the defining data from the programmable logic controller in a format that enables modification of the matrix.

One example of such a matrix is a Cause and Effects Matrix for a safety monitoring system for a process control system. The causes of the matrix correspond to the elements/variables and the effects of the matrix correspond to the responses. The interface enables the user to define a sensor and a trip definition for that sensor associated with the cause. The interface also enables the user to define an actuator and an output definition associated with the effect. The interface also enables the user to define the relationship between a particular cause and a particular effect at the intersection of a Cause row and an Effect column. Once all the information for the causes, the effects, and the intersections, required for the matrix, is input using the programming tool, the information is directly transferred to a matrix functional unit (MFU) 18 of a programmable logic controller (PLC) 78. Therein the cause information is input to a cause functional unit (CFU) 20. For each specific cause of the matrix, a cause logic array is automatically instantiated and configured within the CFU to implement a specific cause. The effect information is input to an effect functional unit (EFU) 24. For each specific effect of the matrix, an effect logic array is automatically instantiated and configured within the EFU to implement a specific effect. Once the matrix has been downloaded to the PLC 78 and the appropriate logic arrays are established, the system is ready to monitor a process system for which the Cause and Effects Matrix was created. By self generating the necessary logic, the present invention removes the need for a control engineer/user to generate logic for implementing the matrix. By starting with a predefined yet configurable functional unit for the causes and the effects, the present invention may specifically configure each particular cause and effect of a matrix based upon the particular cause/effect record information. The user does not have to concern himself about testing or retesting the logic when the logic for a matrix is initially generated or modified.

Figure 1:
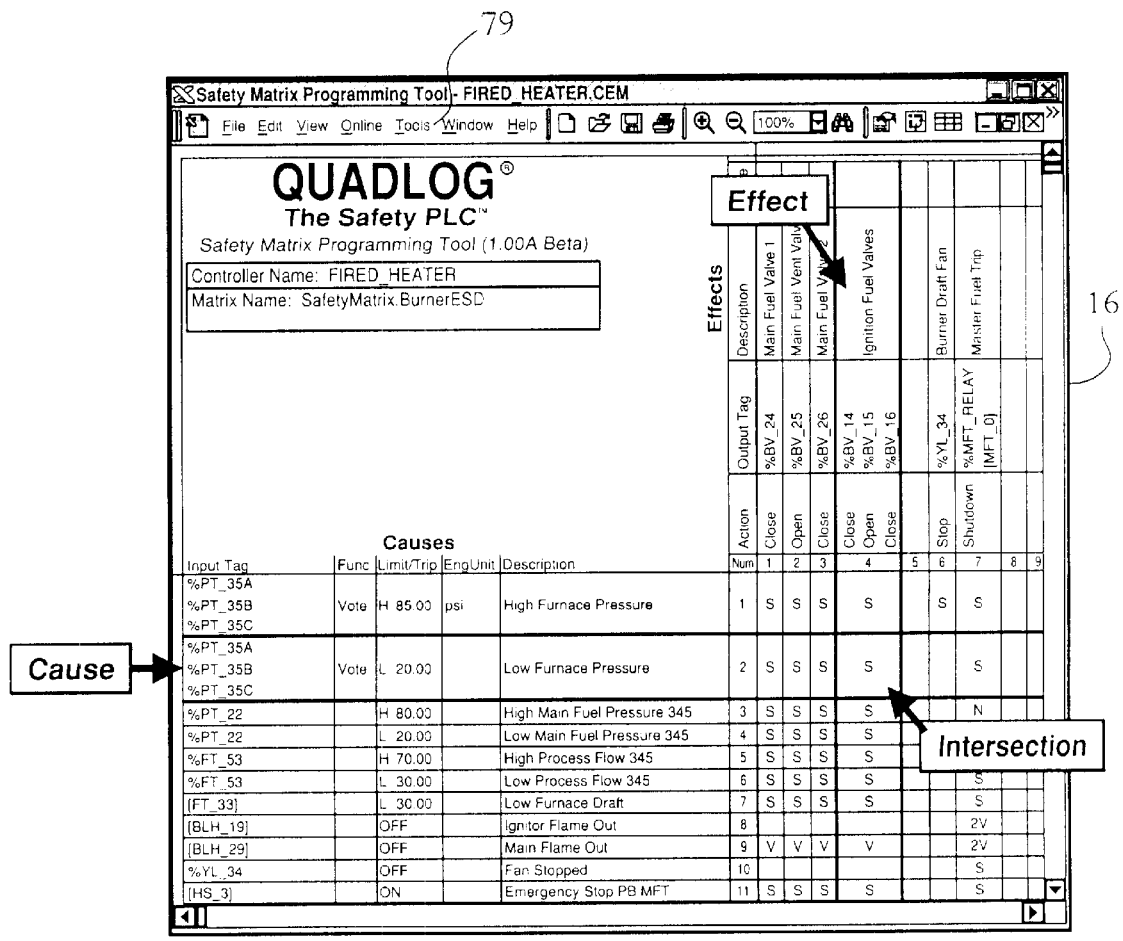
FIG. 1 is an example of a Cause and Effects Matrix created using the present invention.

As illustrated in FIG. 2, the present invention includes a conventional digital computer 6 including a central processing unit 8, an input device 10, an output device 12, and a memory element 14. The memory element 14 may be a combination of read only memory (ROM) and random access memory (RAM). A program comprising an instruction set to graphically create and configure a matrix 16 may be stored in the memory element 14. The program defines the matrix programming tool. FIG. 1 illustrates an example of the matrix 16 generated using the programming tool. Referring to FIG. 3, once the matrix 16 is generated using the tool, the matrix 16 is transferred and input into a matrix functional unit (MFU) 18. The MFU 18 includes a cause functional unit (CFU) 20, an intersection functional unit (IFU) 22, an effect functional unit (EFU) 24, a matrix control functional unit block (MCFU) 26, a cause array 28, and an effects array 30.

Figure 4:
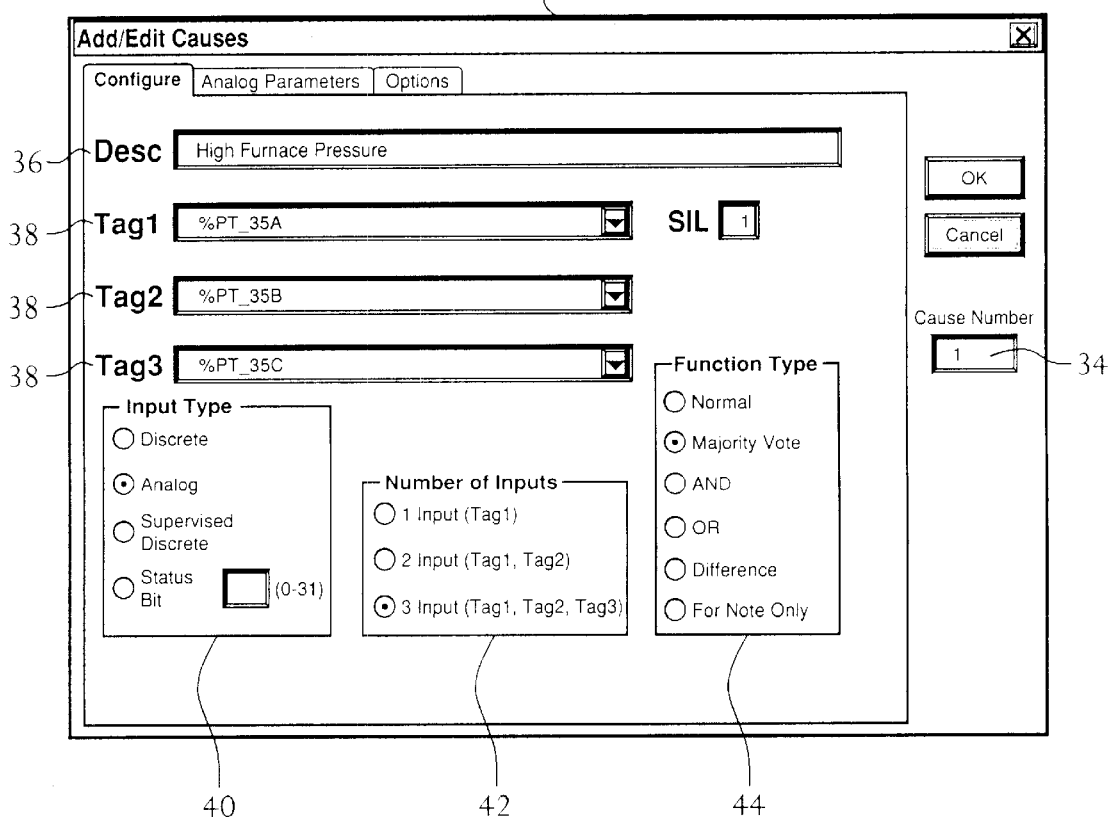
FIG. 4 is a cause dialog box for entering information to the matrix of FIG. 1.

The matrix programming tool allows a user to define matrix parameters. Referring to FIGS. 1 and 4–6, the cause parameters are defined in the following manner. Through the use of a pull-down menu system or icons, the user can add or edit a cause. Once the user chooses to add/edit a cause, a dialogue box 32 opens. Using the input device 10, the user is able to enter the desired data to define a particular cause. The user selects one of three tabs, "Configure," "Analog Parameters," or "Options" to begin defining the cause. Each tab enables the user to consider and define various parameters for a particular cause. The "Configure" tab, illustrated in FIG. 4, provides several parameters. A "Cause Number" input 34 indicates which cause is being defined. A "Desc"

input 36 provides an alphanumeric description of the cause. A "Tag__" input 38 defines the actuator(s) that the cause is to monitor. For example, the illustrated cause will monitor and receive data from three actuators having the tags %PT__35A, %PT__35B, and %PT__35C. This information is listed in the matrix 16 under the "Input Tag" column. An "Input Type" input 40 allows the user to select the type of input received from the actuator(s) being monitored. The input type must be discrete, analog, or supervised discrete. In this example, the input is analog. A "number of inputs" input 42 allows the user to select the number of sensor(s) the cause will monitor. In this example, the cause monitors three sensors. A "Function Type" input 44 defines the manner in which the data received from the actuators being monitored will be interpreted to determine if an event has occurred which requires a response. In this example, the cause will take a majority vote of the three sensors being monitored. In other words, if two out of the three sensors satisfy a threshold set of conditions then the cause will trigger a related effect.

Figure 5:
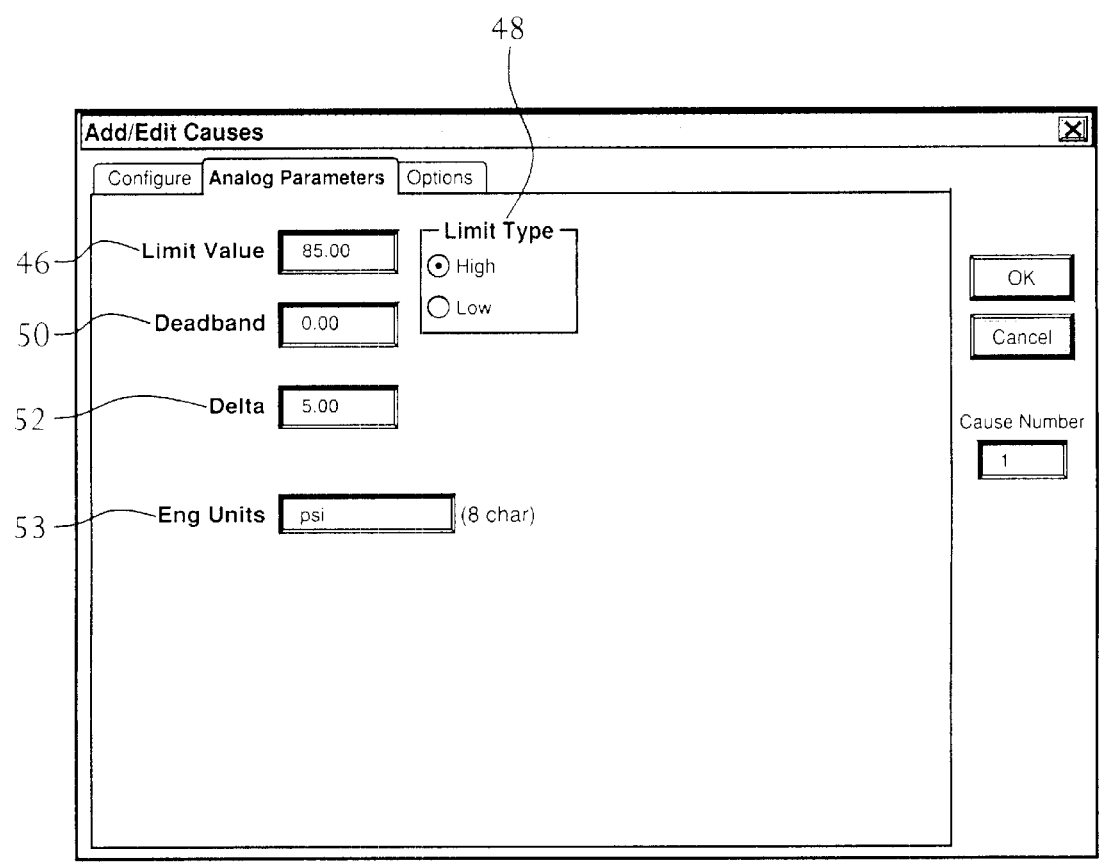
FIG. 5 is another cause dialog box for entering information to the matrix of FIG. 1.

The "Analog Parameters" tab, illustrated in FIG. 5, enables the user to define the parameters for the data received from an analog actuator that would trigger an effect. A "Limit Value" input 46 defines a value at which an event has occurred that would trigger a cause. A "Limit Type" input 48 establishes on which side of the limit value the input data must be in order to trigger the event. The limit value and the limit type are listed in the matrix under the "Limit/Trip" column. A "Deadband" input 50 provides a swing for the sensors input to prevent triggering an event based upon minor swings in the input data from the sensors. A "Delta" value input 52 is used to measure differences between multiple inputs that are redundant (voted). An "Eng Units" input 53 allows the user to define the units associated with the limit value.

Figure 6:
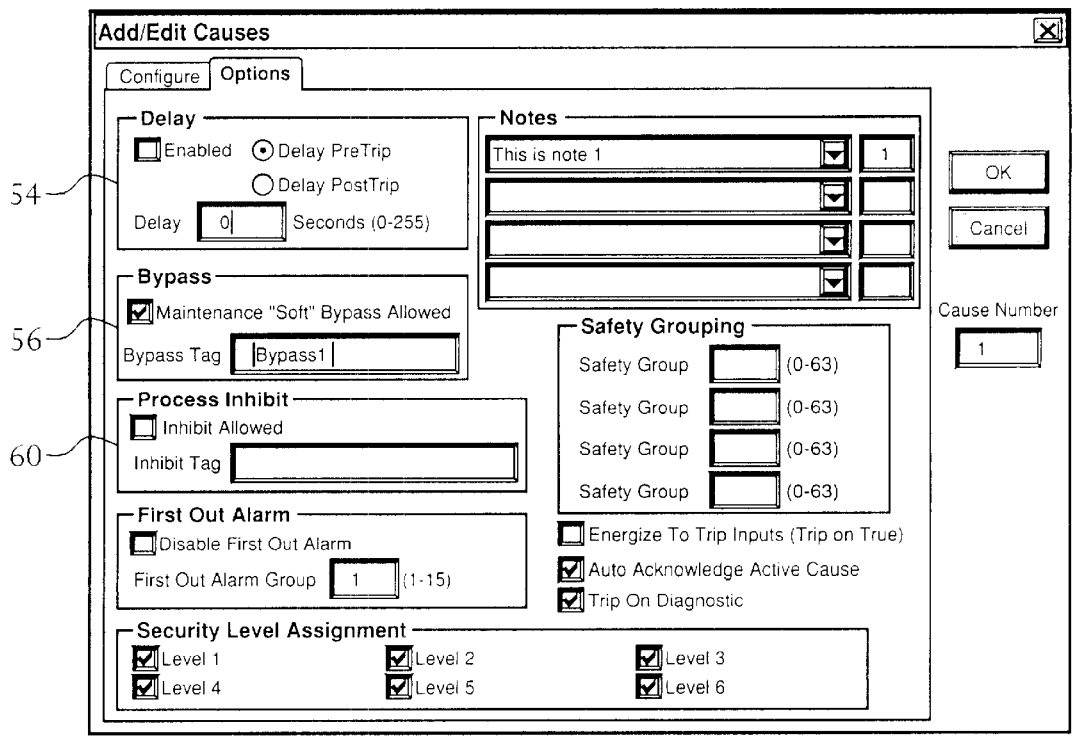
FIG. 6 is another cause dialog box for entering information to the matrix of FIG. 1.

The "Options" tab, illustrated in FIG. 6, enables the user to define a variety of options defining the particular cause. A "Delay" group 54 defines whether an activated cause can be delayed, when, and for how long. A "Bypass" input 56 permits an operator initiated maintenance in the monitor mode. A "Process Inhibit" group 58 enables an External signal to override an active cause.

Figure 7:
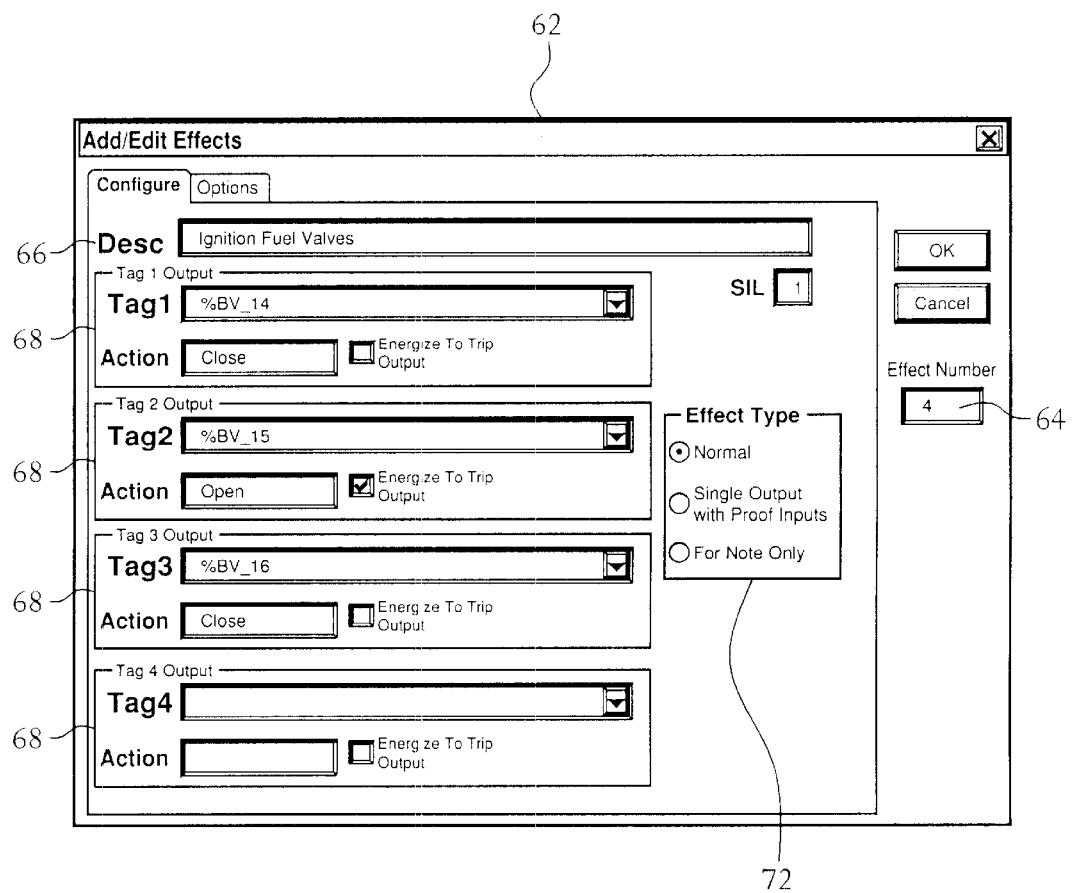
FIG. 7 is an effects dialog box for entering information to the matrix of FIG. 1.
Figure 8:
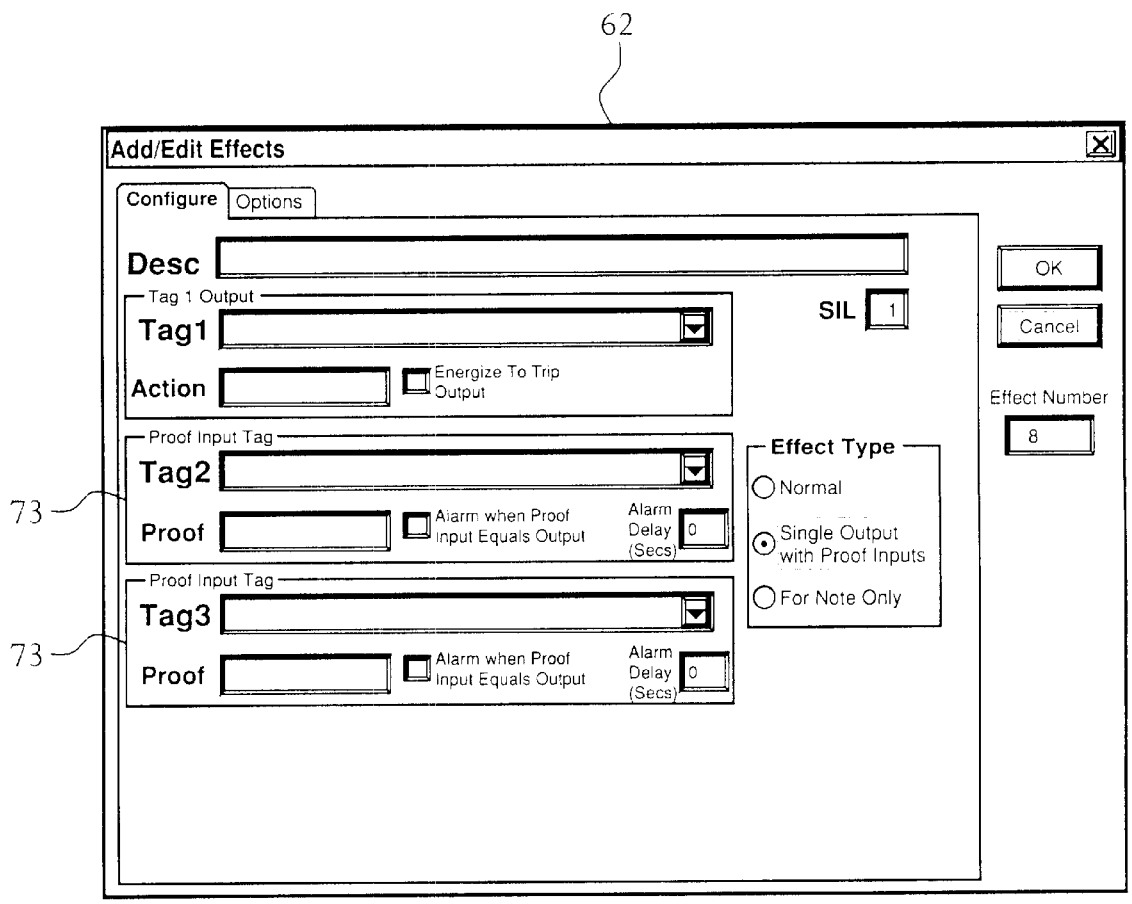
FIG. 8 is another effects dialog box for entering information to the matrix of FIG. 1.
Figure 9:
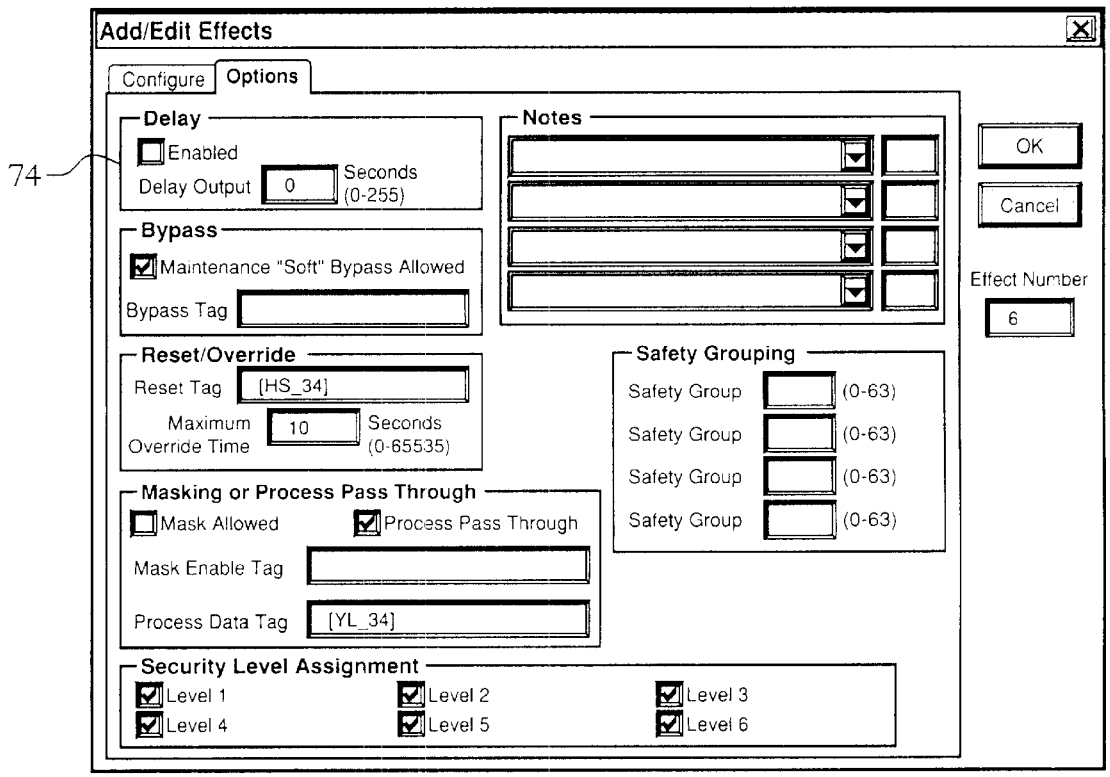
FIG. 9 is another effects dialog box for entering information to the matrix of FIG. 1.

Referring to FIGS. 1 and 7–9, the matrix configuration tool allows the user to define effects parameters in a similar manner. Referring to FIG. 7, the user opens a dialogue box 62 to add and/or edit an effect. The user selects one of two tabs, "Configure" or "Options" to begin defining the effect. Each tab enables the user to consider and define various parameters for a particular effect. The "Configure" tab provides several parameters. An "Effect Number" input 64 indicates which effect is being defined. A "Desc" input 66 provides an alphanumeric description of the effect. Four "Tag_Output" groups 68 include a "Tag__" input that defines the actuator(s) which the effect will operate in response to a triggering event and an "Action" input 70 that describes the act that the effect will direct the associated actuator(s) to implement. An "Effect Type" input 72 defines normal, single output with proof inputs, or Note Effect. If the "single output with proof inputs" effect type is selected, as in FIG. 8, "Proof Input Tag" groups 73 will appear in the "Configure" dialogue box 62. This feature allows an actuator to be monitored without having to create separate logic. The "Options" tab, illustrated in FIG. 9, allows the user to set a variety of options related to the particular effect. For example, a "Delay" group 74 allows the user to configure the effect to include a delay prior to implementing the effect.

Figure 10:
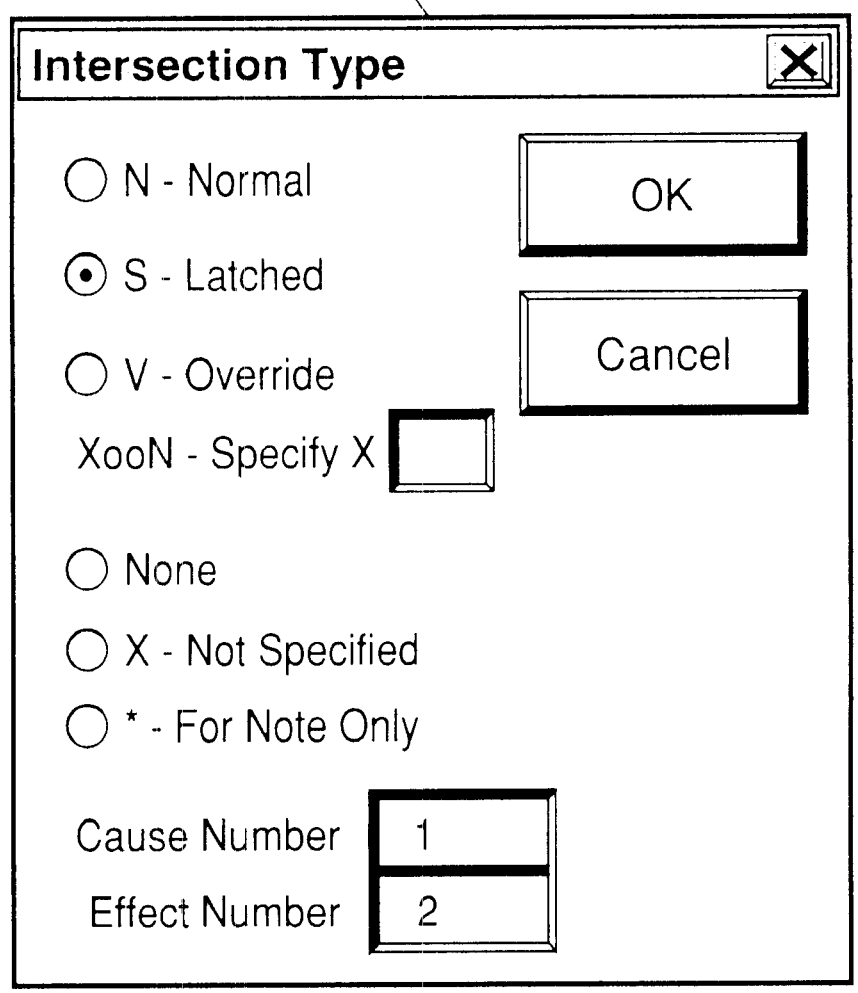
FIG. 10 is an intersection dialog box for entering information to the matrix of FIG. 1.

Referring to FIGS. 1 and 10, the matrix configuration tool allows the user to define intersection parameters in the following manner. Referring to FIG. 10, the user opens an intersection dialogue box 76 to define the intersection between a particular cause and a particular effect. The user selects one of the intersection types. When "Normal" is selected, the effect will return to its "unsafe" state as soon as the related cause returns to normal. In other words, when the data supplied to the particular cause from the sensor(s) being monitored no longer meets the parameters that triggered the cause, the effect will cease the activity called for by the triggering event. For example, as illustrated in FIG. 1, for Cause Number 3 and Effect Number 7, when the main fuel pressure exceeds 80 psi, as determined by the sensor having the tag designation %PT__22, the actuator designated %MFT__Relay will shut down. Since the intersection type is selected as normal, once the fuel pressure falls below 80 psi, the actuator designated %MFT__Relay will automatically restart.

When "Latched" is selected, the effect will only turn to its "unsafe" state after an operator has activated a restart button. In other words, when the data supplied to the particular cause from the sensor(s) being monitored no longer satisfies the parameters that triggered the cause, the effect will return to its pre-triggering event state only when the operator has performed an affirmative act of depressing the restart button. This allows the operator a measure of control in restarting the subsystem being monitored. For example, as illustrated in FIG. 1, for Cause Number 2 and Effect Number 4 when the furnace pressure falls below 20 psi, as determined by the actuators having the tag designations %PT__35A, %PT__35B, and %PT__35C, the actuators having the tag designations %BV__14, %BV__15, and %BV__16 will close, open, and close, respectively. Since the intersection type selected for the intersection of Cause Number 1 and Effect Number 1 is latched, when the furnace pressure rises above 20 psi, the actuators designated %BV__14, %BV__15, and %BV__16 will open, close, and open, respectively, only when the operator activates the restart button.

When "Override" is selected, the effect will return to its "unsafe" state while the cause is still active if the operator activates the restart button. In other words, even though the data supplied to the particular cause from the sensor(s) being monitored still meets the parameters that triggered the cause, the effect will return to its pre-triggering event state if and when the operator has performed an affirmative act of depressing the restart button. For example, as illustrated in FIG. 1, for Cause Number 9 and Effect Number 1, when the Main Flame is out, as determined by the sensor having the tag designation BLH__29, the actuator having the tag designation %BV__24 will close. Since the intersection type selected for the intersection of Cause Number 9 and Effect Number 1 is override, even if the main flame remains out than the actuator designated %BV__24 will open when the operator activates the restart button.

In addition to selecting a particular intersection type, several intersections may be linked to require multiple triggering events to occur before a particular effect will be activated. For example, as illustrated in FIG. 1, two causes, Cause Number 8 and Cause Number 9 have been linked together. Only when both causes are triggered will Effect 7 be triggered. Specifically, when the ignitor flame (Cause 8) and the main flame (Cause 9) are out, as determined by the sensors having tag designations %BLH__19 and %BLH__29, respectively, the actuators having tags designations %MFT__Relay and MFT__0 will shut down. Because intersection type is selected as override, the effect can be reset by operating the restart button even if the two causes still satisfy the triggering parameters.

Figure 11:
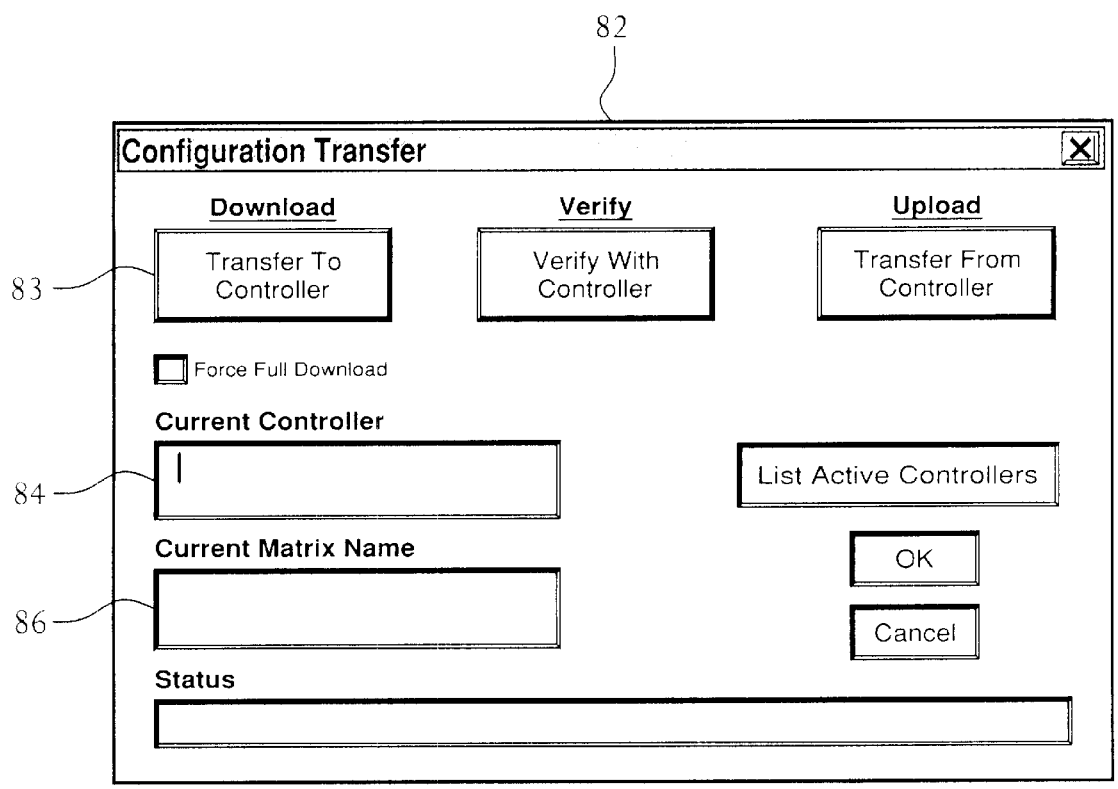
FIG. 11 is a configuration transfer dialog box for transferring information defining the matrix of FIG. 1 to a matrix functional unit of FIG. 3.

By defining the cause parameters, the effect parameters, and the intersection parameters, using the dialogue boxes, illustrated in FIGS. 4–10, the user creates a matrix database that holds all of the information defining the constructed matrix. Once the matrix has been completely constructed, the user may then download the matrix database to a programmable logic controller (PLC) 78 using the matrix programming tool. By using the pull-down menu system on the matrix main screen 79 (see FIG. 1), a configuration transfer dialogue box 82, illustrated in FIG. 11, enables the user to select a "Transfer To Controller" button 83. The user selects the PLC 78 that will receive the matrix database in a "Current Controller" box 84 and defines the particular matrix database to be transferred in a "Current Matrix Name" box 86. By selecting "OK", the matrix database is transferred to the selected PLC 78. Upon receiving the matrix database, the selected PLC 78 automatically establishes the logic to implement the matrix 16.

Referring to FIG. 3, a PLC 78 includes the MFU 18. In a preferred implementation, the MFU 18 is pre-configured with a set of standard function blocks that serve as the starting point for creating the logic pathways for implementing the matrix 16. A "standard function block" is simply a collection of related functions. A function may be considered a program unit that, given values for input parameters, computes an output value. In the preferred embodiment, the set of standard function blocks in the MFU 18 includes a cause function block corresponding to the CFU 20, an effects function block corresponding to the EFU 24, and an intersection function block corresponding to the IFU 22. In addition to these standard function blocks, the MFU 18 includes a cause array 28 and an effect array 30.

Figure 12:
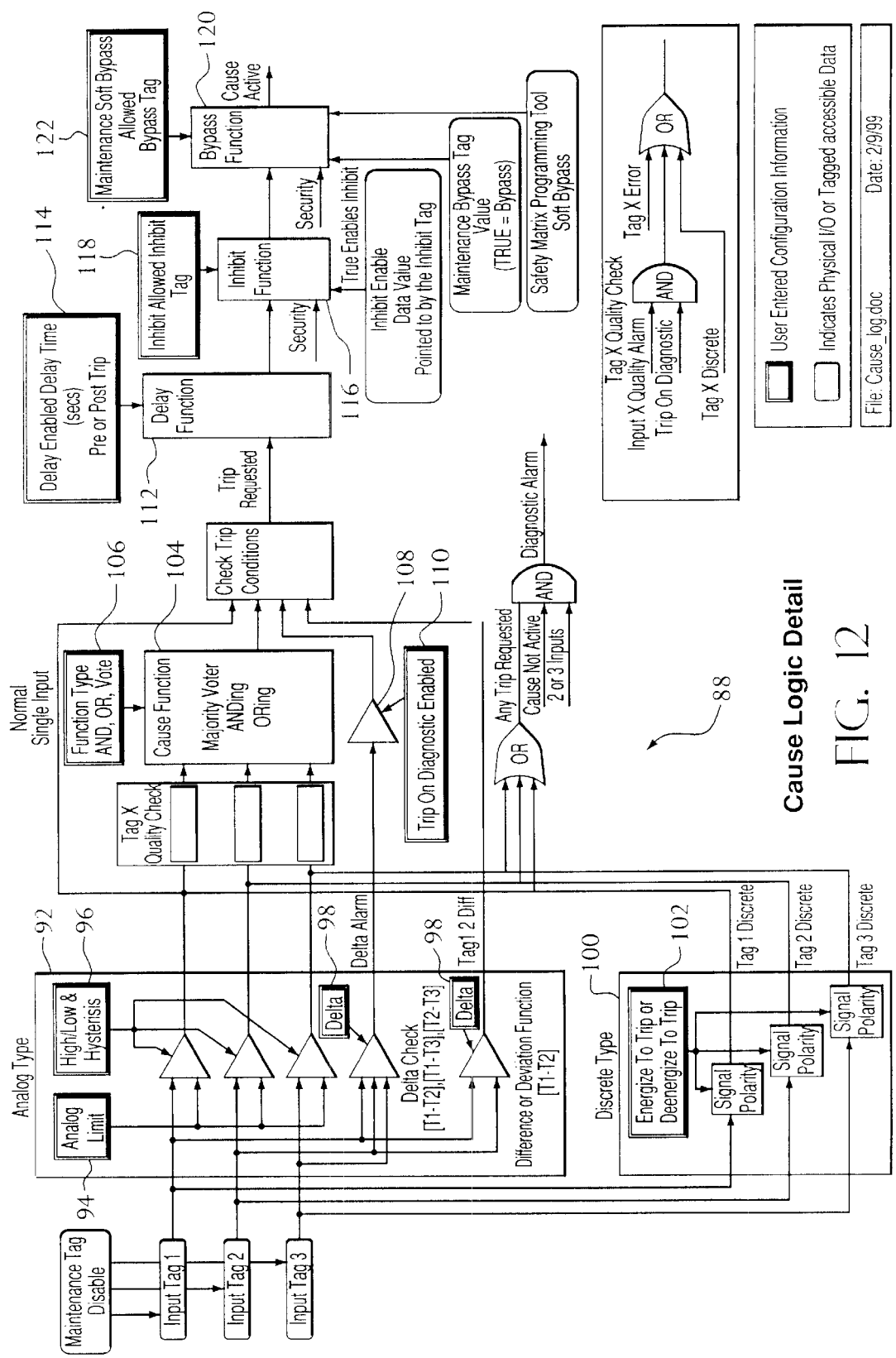
FIG. 12 is an example of a logic diagram for establishing a cause of the matrix of FIG. 1.
Figure 13:
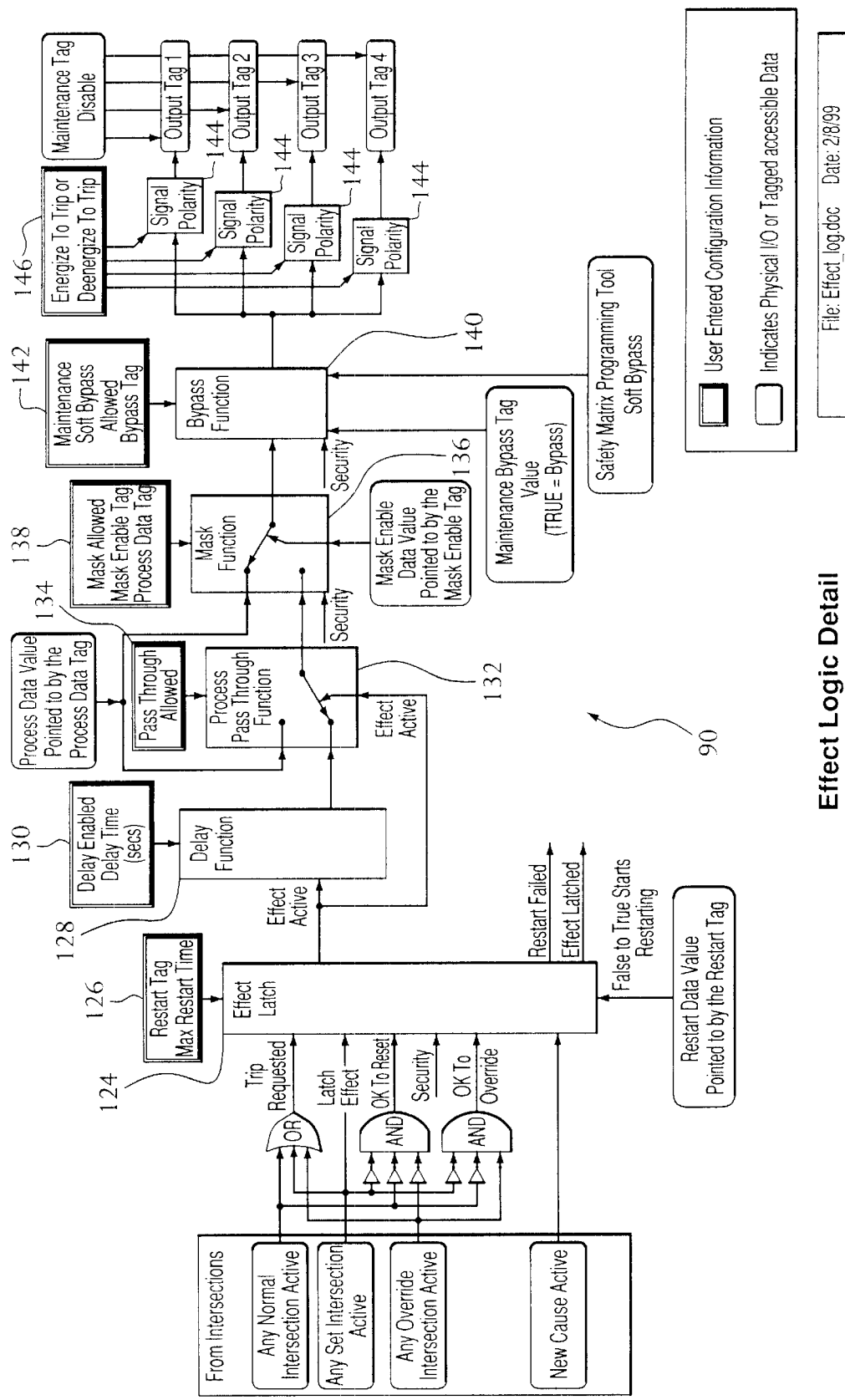
FIG. 13 is an example of a logic diagram for establishing an effect of the matrix of FIG. 1.

The CFU 20 includes a preestablished basic logic arrangement. An example of such a logic arrangement is illustrated in FIG. 12 and indicated generally by numeral 88. For each cause in the matrix 16 a cause logic arrangement (CLA) 88 is instantiated. In general, a CFU 20 may maintain information for several causes. The number of causes for which a CFU 20 may maintain information is limited solely by available technology and economic considerations. In addition, a MFU 18 may include a plurality of standard cause function blocks in order to allow for additional causes in a matrix. As with the CFU 20, the EFU 24 includes a preestablished basic logic arrangement. An example of such a logic arrangement is illustrated in FIG. 13 and referenced generally as numeral 90. For each effect in the matrix 16 an effect logic arrangement (ELA) 90 is instantiated. In general, an EFU 24 may maintain information for several effects. The number of effects for which an EFU 24 may maintain information is limited solely by available technology and economic considerations. In addition, a MFU 18 may include a plurality of standard effect function blocks in order to allow for additional effects in a matrix.

As stated above, upon instruction by the user the matrix database is transferred to the MFU 18. The matrix database information related to the causes is transferred to a cause memory element 21 of the CFU 20, in which a cause database is established. The cause database maintains a record for each cause in the matrix 16. Each record holds the cause information input to the matrix database via the cause configuration dialogue boxes, shown in FIGS. 4–6, as described above. The matrix database information related to the effects is transferred to an effects memory element 25 of the EFU 24, in which an effects database is established. The effects database maintains a record for each effect of the matrix 16. Each record holds the effect information input to the matrix database via the effect configuration dialogue boxes, shown in FIGS. 7–9, as described above. The matrix database information related to the intersection of the causes and the effect is transferred to an intersection memory element 23 of the IFU 22, in which an intersection database is established. The intersection database maintains a record for each marked intersection in the matrix 16. Each record holds the intersection information input to the matrix database via the intersection configuration dialogue box, shown in FIGS. 10, as described above.

For each cause in the matrix 16, the cause information held in the corresponding record of the cause database is transferred to various logic elements of the CLA 88, illustrated in FIG. 12, to define and establish the logic pathways to implement the particular cause. The logic elements receive input data from sensors or from other logic elements and provide outputs based upon their particular function, the input data and the cause information. The logic arrangement detailed in FIG. 12 is merely an example of a configuration of a standard cause function block. The CLA 88 is simply a collection of predefined functions and operations to implement a cause. The CLA 88 may be linked to a plurality of sensors. In this example, the CLA 88 is linked to three sensors. Each sensor linked to the CLA 88 provides data to one of the inputs of the CLA 88. For each cause, the tag(s) designating the sensor(s) that the cause is to monitor is received from the cause database and associated with the one of the inputs. As such, the cause is linked to a specified sensor(s) and may receive data from that (those) sensor(s).

An Analog Type logic element 92 receives an Analog Limit value 94. High/Low & Deadman values 96, and a Delta value 98 from the cause database. A Discrete Type logic element 100 receives an Energize to Trip Or De-energize to Trip value 102 from the cause database.

A Cause Function logic element 104 receives a function type 106 from the cause database. An amplifier logic element 108 receives a Trip on Diagnostic Enabled value 110 from the cause database. A Delay Function logic element 112 receives a Delay Enabled Status, a Delay Time, and a Pre or Post-Trip Status 114 from the cause database. An Inhibit Function logic element 116 receives an Inhibit Allowed Status and an Inhibit Tag 118 and a Bypass Function logic element 120 receives a Maintenance Soft Bypass Allowed and Bypass Tag 122 from the cause database.

Transferring the cause database information for a particular cause to a cause logic arrangement in the CFU 20 provides parameter values to the various logic elements, as described above. This automatically defines and establishes the specific logic pathways for the particular cause. Thereafter, the defined cause logic is ready to receive data from the associated sensor(s) and operate on that data to determine if the cause should go active to trigger one or more related effects.

As with the causes, for each effect in the matrix 16, effect information held in the corresponding record of the effect database is transferred to various logic elements of the ELA 90, illustrated in FIG. 13, to define and establish logic pathways to implement the particular effect. The logic elements receive input data from IFU 22 or from other logic elements and provide outputs based upon their particular function, the input data, and the effect information. The logic arrangement detailed in FIG. 13 is merely an example of a configuration of a standard effect function block. The ELA 90 is simply a collection of predefined functions and operations to implement an effect. The ELA 90 receives inputs from the IFU 22 via the effect array 30.

As illustrated in FIG. 13, an Effect Latch Function logic element 124 receives a Restart Tag and a Max Restart Time value 126 from the effects database. In addition, a Delay Function logic element 128 receives a Delay Enabled Status and Delay Time value 130, a Process Pass Through Function logic element 132 receives a Pass Through Allowed Status value 134, a Mask Function logic element 136 receives a Mask Allowed Status, Mask Enable Tag and a Process Data Tag 138, a Bypass Function logic element 140 receives a Maintenance Soft Bypass Allowed Status and a Bypass Tag 142 and a plurality of Signal Polarity logic elements 144 receive an Energized To Trip Or De-Energize To Trip Status value 146 from the effects database. The ELA 90 may be linked to several actuators. Each actuator linked to the ELA 90 receives data from the ELA 90 to operate the actuators as required by the current status of the system. For each effect, the tag(s) designating the actuator(s) that the effect is to operate is received from the effects database and associated with one of the outputs.

Transferring the effects database information for a particular effect to an ELA 90 in the EFU 24 provides parameter values to the various elements, as described above. This automatically defines and establishes the specific logic pathways for the particular effect. Thereafter, the defined ELA 90 is ready to receive data from the associated cause(s) and operate on that data to activate associated actuator(s) as necessary.

Figure 14:
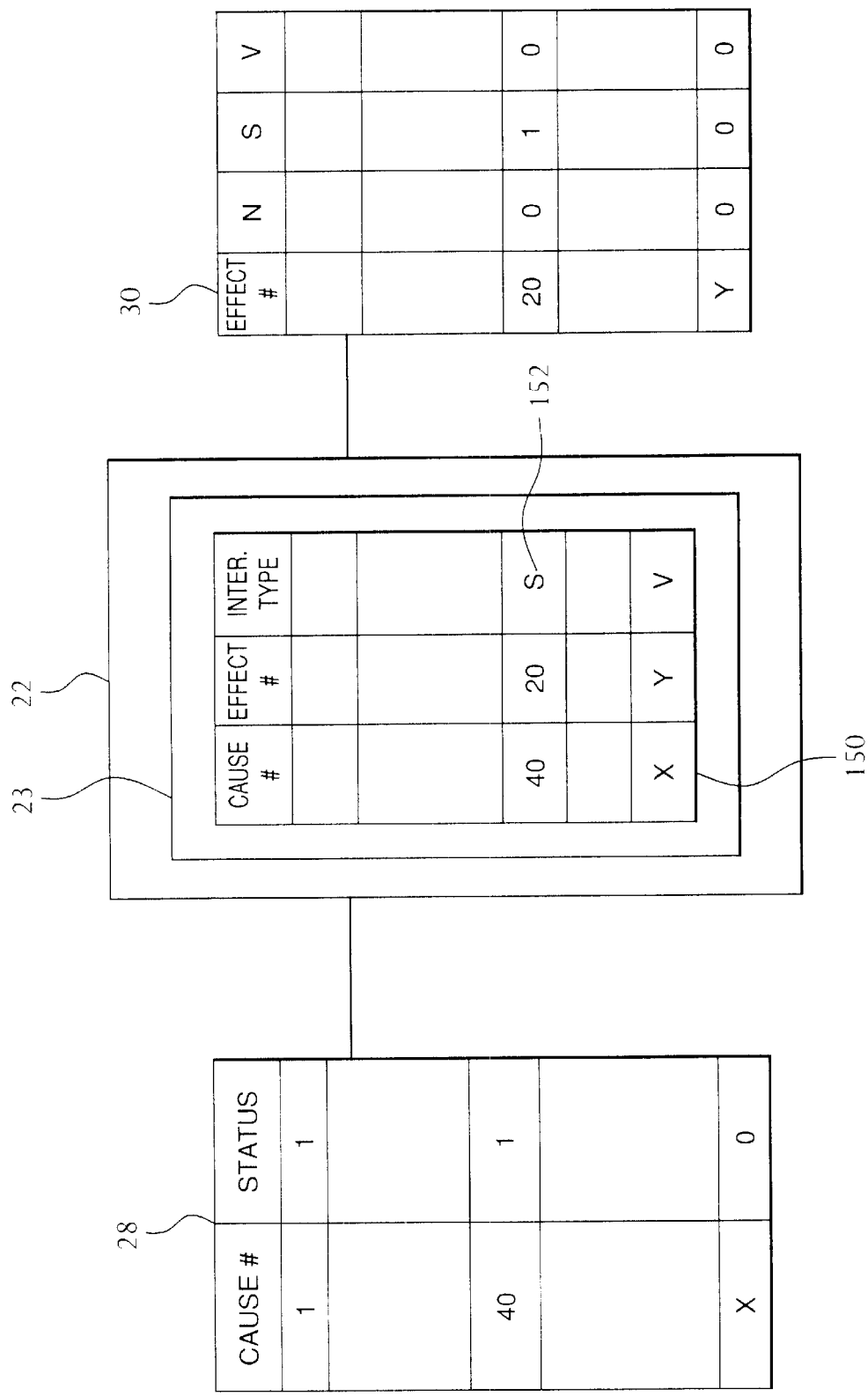
FIG. 14 is a block diagram of a cause array, an intersection functional unit and an effect array of the present invention.

Referring to FIG. 14, as with the causes and the effects, for each marked intersection in the matrix 16, intersection information held in a corresponding record of the intersection database is transferred to the intersection memory element 23 of the IFU 22. This information includes the type of intersection and the cause number and the effect number. Within the intersection memory element 23 another intersection database 150 is established. The database 150 includes a plurality of records 152, one for each marked intersection of the matrix 16. Each record 152 includes the cause number, the effect number and the intersection type for the particular intersection. The IFU 22 receives a cause number and a status for the enumerated cause from the cause array 28. The intersection function block includes logic to iterate through the intersection database and determine the effects that are associated with the particular cause and provide an activation signal for particular intersection type. For example, if cause 40 is activated in accordance with the cause logic, then the cause array 28 will have an active bit ("1") for that cause. The intersection record establishes that cause number 40 is associated with effect number 20 and that the intersection type is "set". As a result, the IFU 22 will output an active bit for effect number 20 to the intersection type "set". The effect array 30 will receive an active bit for effect number 20 for the intersection type "set" which in turn will provide the active bit for effect number 20, intersection type "set" to the EFU 24.

As described in the foregoing, once the information defining the parameters of the causes, effects and the intersections is input to the matrix database using the matrix programming tool, the logic that implements the matrix is automatically defined and established simply by transferring the matrix database to the PLC 78.

Once the logic pathways for each cause and effect are defined and established, the PLC 78 receives input signals from the various sensors of the process system. The input signals are fed to the appropriate CLAs 88, as defined by the cause information. The CLAs 88 generate and output a cause status signal. The cause status signal is fed to the cause array 28 wherein the status of each cause is maintained. A cause is either active (cause status signal is 1) or is inactive (cause status signal 0). A cause becomes active when a trip condition is determined by the cause logic. The cause array 28 provides the cause status signal to the IFU 22. The IFU 22 checks each marked intersection. If a cause status signal is active each effect associated with the active cause is set to active in the effect array 30. An effect status signal for each effect is fed to the corresponding ELA 90 in the EFU 24. The intersection type determines which input 123a, 123b, or 123c, receives the effect status signal. Upon receipt of the active effect status signal, the ELA 90 processes the signal data to activate the actuator(s) associated with the effect.

The matrix 16 and the matrix database, including the matrix information entered using the programming tool, is saved as an accessible file in the memory device 14. This allows the user to access the matrix 16 and the matrix database at a later time. This saved copy can be accessed and edited by simply retrieving the saved copy and editing the matrix 16 using the matrix programming tool thereby creating a new matrix. The new matrix can be compared to the original matrix. In addition, the matrix database stored in the PLC 78 is saved in a format that enables the user to upload the database to the computer 6 for editing, modification and/or comparison to the saved copy of the matrix and the matrix database and transferring the edited/modified version back to the PLC78.

In addition to the CFU 20 and the EFU 24, the PLC 78 includes a matrix control functional unit 26. The MCFU 26 receives several pieces of information from the matrix database, including status for allowing a cause or effect to be inhibited, for allowing a operator to restart or bypass the cause and for allowing a maintenance override.

Embodiments of the system for creating and implementing a monitoring system may comprise a general purpose computer. Such a general purpose computer may have any number of basic configurations. For example, such a general purpose computer may comprise a central processing unit (CPU), one or more specialized processors, system memory, a mass storage device such as a magnetic disk, an optical disk, or other storage device, an input means such as a keyboard or mouse, a display device, and a printer or other output device. A system implementing the present invention can also comprise a special purpose computer or other hardware system and all should be included within the its scope.

Embodiments within the scope of the present invention also include computer program products comprising computer readable medium having embodied therein program code means. Such computer readable media can be any available media which can be accessed by a general purpose or special purpose computer. By way of example, and not limitation, such computer readable media can comprise RAM, ROM, EEPROM, CD ROM, DVD or other optical disk storage, magnetic disk storage or other magnetic storage devices, or any other medium which can embody the desired program code means and which can be accessed by a general purpose or special purpose computer. Combinations of the above should also be included within the scope of computer readable media. Program code means comprises, for example, executable instructions and data which cause a general purpose computer or special purpose computer to perform a certain function of a group of function.

The present invention may be implemented for purposes other than safety monitoring systems, including process control systems, financial market monitoring systems or any other system which requires monitoring of various input elements or variables and responses to changes in those input elements/variables.

The present invention may be embodied in other specific forms without departing from the spirit or essential attributes thereof and, accordingly, reference should be made to the appended claims, rather than to the foregoing specification, as indicating the scope of the invention.

What is claimed is:

1. A method for generating logic for a cause and effects matrix, said cause and effects matrix sets forth a relationship between a particular cause and a particular effect of a programmable logic controller, comprising the steps of:

providing a user interface wherein a user defines said parameters on said interface that set forth said relationship between said cause and said effect;

generating a matrix including data defining an input parameter, an output response said programmable logic controller and the relationship between the input parameter and the output response; and transferring said data to a matrix functional unit, the matrix functional unit including an input functional unit, an output functional unit and an intersection functional unit, the input functional unit including predefined, configurable logic elements for defining an input parameter, the output functional unit including predefined, configurable logic elements for defining an output response, and the intersection functional unit including predefined, configurable logic elements for defining the relationship between the input parameter and the output response, thereby configuring the predefined input functional unit logic elements, configuring the predefined output functional unit logic elements, and configuring the predefined intersection functional unit logic elements.

2. A method as recited in claim 1, further comprising the step of recalling the defining data from the matrix functional unit in a format enabling modification of the matrix.

3. A method as recited in claim 1, wherein the matrix is a cause and effects matrix for a safety monitoring system, the input function block defines causes of the matrix, and the output function block defines effects of the matrix.

4. A system for generating logic for a cause and effects matrix, said cause and effects matrix sets forth a relationship between a particular cause and a particular effect of a programmable logic controller, comprising:

a user interface wherein a user defines said parameters on said interface that set forth said relationship between said cause and said effect;

a matrix functional unit including an input functional unit, an output functional unit and an intersection functional unit, the input functional unit including predefined, configurable logic elements for defining an input parameter, the output functional unit including predefined, configurable logic elements for defining an output response, and the intersection functional unit including predefined, configurable logic elements for defining the relationship between the input parameter and the output response;

a matrix database including data defining the input parameter, the output response and the relationship between the input parameter and the output response; and a matrix programming tool for inputting the data into the matrix database and transferring the data directly to the matrix functional unit.

5. A system as recited in claim 4, wherein the programming tool includes a graphical user interface for inputting the defining data.

6. A system as recited in claim 4, wherein logic pathways are automatically established in the input functional unit, the output functional unit, and the intersection functional unit upon receipt of the data from the programming tool.

7. A system as recited in claim 4, wherein the matrix functional unit comprises a database for storing the data received from the matrix database and the programming tool may recall the data from the matrix functional unit database, modify the data, and transfer the data to the matrix functional unit to automatically modify the logic pathways in the input functional unit and the output functional unit.

8. A system as recited in claim 4, wherein the matrix is a cause and effects matrix for a safety monitoring system, the input functional unit defines causes of the matrix, the output functional unit defines effects of the matrix and the intersection functional unit defines relationships between the causes and the effects.

9. A computer-readable medium on which is stored a computer program for providing a method for generating logic for a cause and effects matrix, said cause and effects matrix sets forth a relationship between a particular cause and a particular effect of a programmable logic controller, the computer program comprising instructions which, when executed by a computer, perform the steps of:

providing a user interface wherein a user defines said parameters on said interface that set forth said relationship between said cause and said effect;

enabling the receipt of user input data defining an input parameter, an output response and a relationship between the input parameter and the output response;

generating a matrix database of received user input data; and enabling the transfer of the matrix database to a matrix functional unit, the matrix functional unit including an input functional unit, an output functional unit and an intersection functional unit, the input functional unit including predefined, configurable logic elements for defining an input parameter, the output functional unit including predefined, configurable logic elements for defining an output response, and the intersection functional unit including predefined, configurable logic elements for defining the relationship between the input parameter and the output response, whereby transferring the matrix database to the matrix functional unit configures the predefined input functional unit logic elements for the input parameter, configures the predefined output functional unit logic elements for the output response, and configures the predefined intersection functional unit logic elements for the intersection of the input parameter and the output response.

10. A computer-readable medium on which is stored a computer program as recited in claim 9, the computer program further comprising instructions for performing the steps of storing the matrix database in the matrix functional unit and recalling the matrix database from the matrix functional unit in a format that enable modification of the matrix database.

11. A computer system for generating logic for cause and effects matrix, said cause and effects matrix sets forth a relationship between a particular cause and a particular effect of a programmable logic controller, comprising:

a user interface wherein a user defines said parameters on said interface that set forth said relationship between said cause and said effect;

a processing unit;

a memory storage device;

an input device coupled to said processing unit for receiving input data;

an output device coupled to said processing unit for displaying information;

a program module, stored in said memory storage device for providing instructions to said processing unit;

said processing unit, responsive to said intructions of said program module, operative to:

enable the receipt of user input data defining an input parameter, an output response and a relationship between the input parameter and the output response;

generate a matrix database of received user input data; and enable the transfer of the matrix database to a matrix functional unit, the matrix functional unit including an input functional unit, an output functional unit and an intersection functional unit, the input functional unit including predefined, configurable logic elements for defining an input parameter, the output functional unit including predefined, configurable logic elements for defining an output response, and the intersection functional unit including predefined, configurable logic elements for defining the relationship between the input parameter and the output response, whereby transferring the matrix database to the matrix functional unit configures the predefined input functional unit logic elements for the input parameter, configures the predefined output functional unit logic elements for the output response, and configures the predefined intersection functional unit logic elements for the intersection of the input parameter and the output.

* * * * *